(No Model.) 2 Sheets—Sheet 1.
W. H. BARLOW.
FOUR WHEELED DOG CART.
No. 443,423. Patented Dec. 23, 1890.
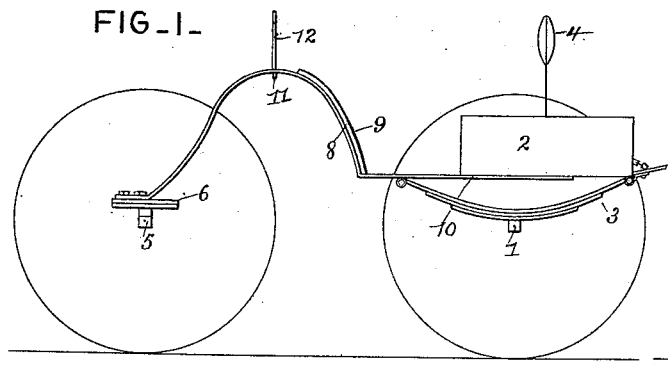
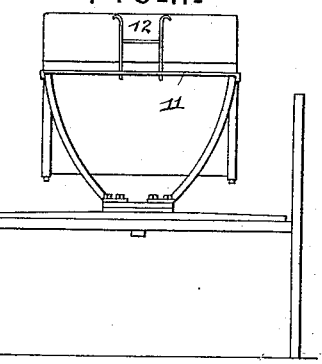
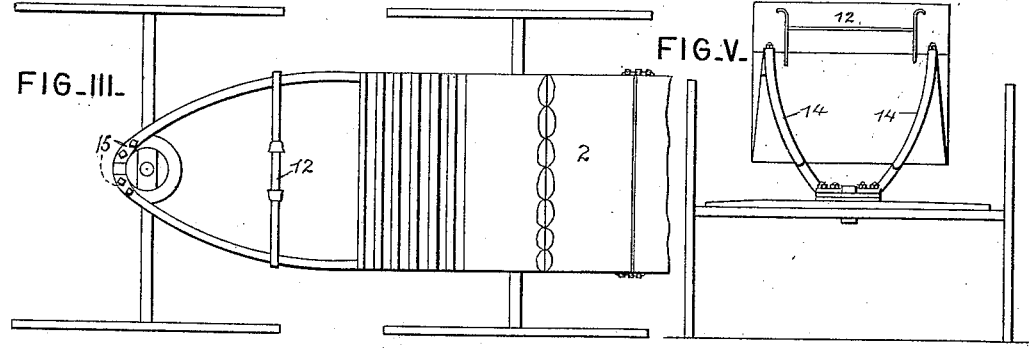
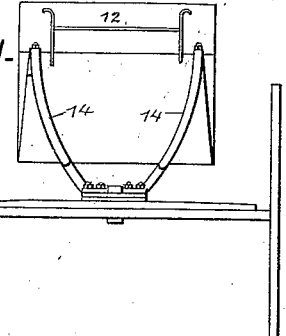
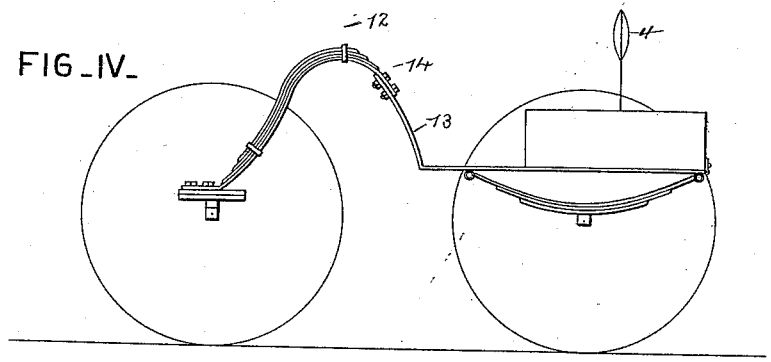
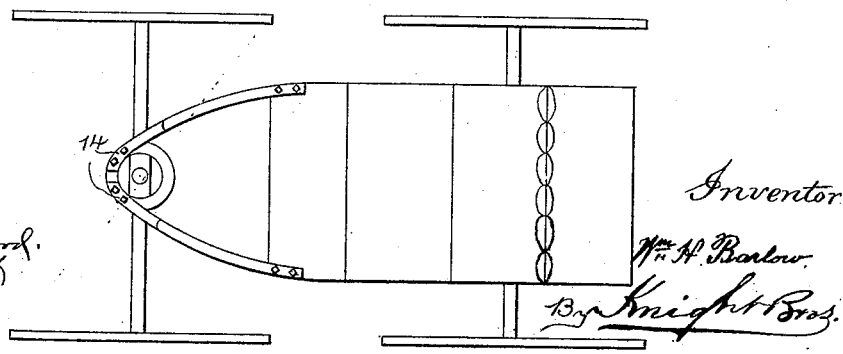
Attest:
Geo. T. Smallwood.
H. S. Knight.
Inventor
Wm. H. Barlow.
By Knight Bros.
attys.

(No Model.) 2 Sheets—Sheet 2.
W. H. BARLOW.
FOUR WHEELED DOG CART.
No. 443,423. Patented Dec. 23, 1890.
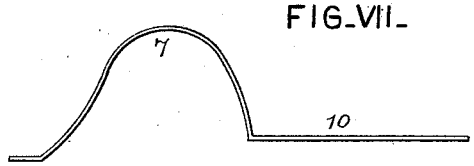
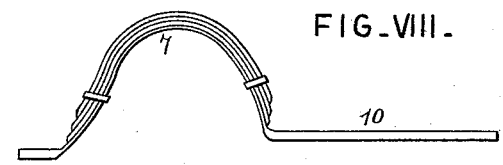
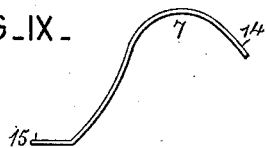
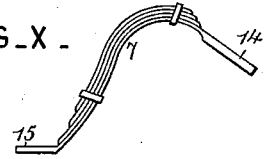
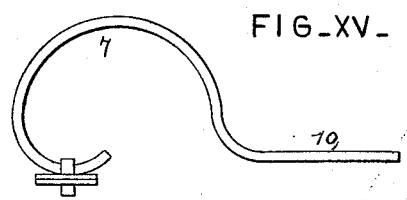
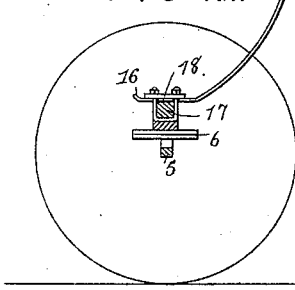
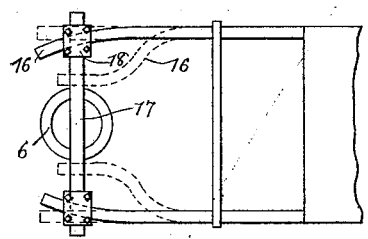
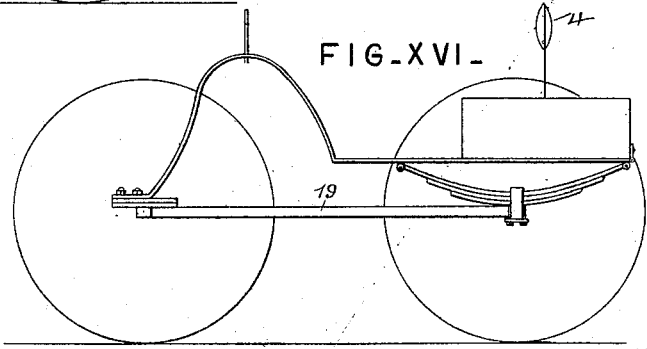
Attest:
Geo. T. Smallwood.
H. S. Knight.
Inventor:
Wm. H. Barlow
By Knight Bros.
attys.

UNITED STATES PATENT OFFICE.

WILLIAM H. BARLOW, OF CHARLOTTESVILLE, VIRGINIA.

FOUR-WHEELED DOG-CART.

SPECIFICATION forming part of Letters Patent No. 443,423, dated December 23, 1890.

Application filed September 21, 1889. Serial No. 324,601. (No model.)

*To all whom it may concern:*

Be it known that I, WILLIAM H. BARLOW, a subject of the Queen of Great Britain, residing at Charlottesville, in the county of Albemarle and State of Virginia, have invented a new and useful Four-Wheeled Dog-Cart, of which the following is a specification.

My invention relates to that class of vehicles wherein the load is mounted over one axle having large wheels for the purpose of securing easy riding. This class of vehicles, however, has certain disadvantages, and it is therefore the object of my invention to overcome such disadvantages and to combine the advantages of such vehicles with the advantages of ordinary four-wheeled vehicles.

To these ends my invention consists in a four-wheeled vehicle having the load balanced over the rear axle and a vertically and horizontally elastic undercut connection between the two axles, so that the front wheels may pass under when the vehicle turns, said undercut-connection being constructed of upwardly-curved spring-bars, preferably two in number, but of which there may be one or more.

The invention further consists in certain other features of novelty and details of construction involved in the above-described principles, all of which will be hereinafter more particularly described, and pointed out in the claims.

In order that my invention may be more fully understood, I will proceed to describe it with reference to the accompanying drawings, in which—

Figure 1 is a side elevation of the preferred form of my improved vehicle. Fig. 2 is a front elevation of the same. Fig. 3 is a plan view of the same. Fig. 4 is a side elevation of another form differing from the first, in that the curved springs are shorter and are secured to the upper edge of an elongated splash-board. Fig. 5 is a front view of the same. Fig. 6 is plan view of the same. Fig. 7 is a detached view showing the construction of the spring-bar employed in Figs. 1, 2, and 3, and constructed of a single rectangular bar of any suitable springy material. Fig. 8 represents a spring for a similar purpose to that ascribed to Fig. 7, but constructed of a number of laminæ secured together, as in an ordinary carriage-spring, and having the ends made solid. Figs. 9 and 10 are views corresponding to Figs. 7 and 8, but showing the form of spring employed in connection with the long splash-board, as represented in Figs. 4, 5, and 6. Figs. 11 and 12 are transverse sections taken on the line 11 11, Figs. 7 and 9, and on the line 12 12, Figs. 8 and 10, respectively. Figs. 13 and 14 are respectively a side elevation and a plan view illustrating a modification in the connection between the springs and the front axle, the same being by a bolster secured to the fifth-wheel and clips holding the springs onto the bolster. In Fig. 14 various lengths of bolster and incident curves in the ends of the springs are illustrated by full and dotted lines. Fig. 15 represents a modification in the form of spring, the object being to increase its flexibility, and consequently the elasticity between the front and rear axles. The curve is prolonged circumferentially, so that the springs terminate in the rearwardly-extending ends. The connection between this spring and the front axle may be of any form set forth in the previously-described figures. If the springs are connected to the fifth-wheel when made in this form, they are preferably attached to the rear half of the upper ring, instead of to the front half, as illustrated in Figs. 1 to 6, inclusive. Fig. 16 represents a vehicle constructed according to my invention and having for additional strength and security a reach-pole, which limits the horizontal stress on the springs.

1 represents the rear axle, over which is balanced the body 2, through the medium of the springs (of any form) 3.

4 is the back, which is common to the one or two seats in the cart, and in this connection it may be stated that the body may be mounted on a suitable frame and be adjustable longitudinally for the purpose of balancing the load when the vehicle is occupied by one or more persons. This, however, is old *per se*, and is not claimed herein.

5 represents the front axle having the fifth-wheel 6, and 7 is the upwardly-curved springs. These springs are preferable two in number, though there may be one, two, or more, and they are preferably secured directly to the fifth-wheel by making their forward parts converge and their forward ends conform to the upper forward half of the fifth-wheel. The springs may, however, be connected to a bolster or cross-piece, and I desire it understood that I do not limit the scope of my invention to any particular form of connection between the improved springs and the rest of the vehicle.

8 refers to a portion of the spring which is curved to form the frame for the splash-board, which consists of thin boards or slats 9, as may be desired.

10 is the horizontal portion of the spring-bars, affording means of attachment to the rear portion of the vehicle or body. These parts may pass along the sills and be bolted thereto. These portions of the spring-bars may be attached to the spring or body, or to both.

11 is a spacing and bracing cross-bar, which is clamped to the springs 7 by means of loops which surround said springs, the object being to brace the springs against transverse movement, but to avoid weakening them by perforations. This cross-bar carries a rack 12 for the reception of the reins.

In Fig. 4 a different construction is shown. Here the rear portion of the vehicle, which resembles an ordinary dog-cart, has a high splash-board 13. To the upper portion of this is attached the springs 7, the ends of the springs being placed on one side and suitable plates on the other, while bolts are passed through both, as illustrated at 14. The rein-rack is here secured to the splash-board.

15 represents the curved end of the springs, made to conform to the fifth-wheel 6, which may, if desired, be made somewhat broader than usual, so as to afford a good seat for the springs. The connection between spring and fifth-wheel may be made with bolts, rivets, or in any convenient way.

In Figs. 13 and 14 are represented modifications in the construction of the forward ends of the springs and the manner of connecting the same to the front axle. The springs are extended and are connected to a bolster of convenient length (the ends being made to converge, if necessary, to meet the ends of the bolster) and then secured by means of a clip and cross-plate 18.

Various lengths of bolster and degrees of converging are illustrated by full and dotted lines in Fig. 14.

In Fig. 15 an additional curve is formed in the spring for the purpose of giving more elasticity of connection between the front and rear axle. This, however, will rarely be found to be necessary, inasmuch as the spring-bars of proper sectional area and with sufficient curve to permit the wheel to turn under will afford abundant flexibility in the bar.

Fig. 16 represents a modification, which under ordinary circumstances will not be required. The reach is for limiting the horizontal stress on the springs, and may be of advantage in severe use of the vehicle, such as over rough ways. It is obvious that the reach would have no particular effect on the up and down flexure of the springs, but simply relieve the horizontal stress in pulling a vehicle out of a hole or over an obstruction, and not in any way impair the effect on the body.

In constructing vehicles according to my invention it is very easy to utilize an existing two or four wheeled vehicle, the only necessary changes in a two-wheeled, other than the additions, being to remove the shafts and splash-board. The springs are then attached to the body and the front axle applied. A four-wheeled buggy is changed by setting back the body and adding the springs.

A vehicle constructed according to my invention will afford exceedingly easy riding and may be turned in a very short space, owing to the under-cut, and the bend of the bars for this purpose is what affords the ease and comfort in the vehicle. The bars are constructed of material such as steel, or a mixture of steel and aluminium, or any other mixture particularly adapted for the purpose. When the front wheels strike an obstacle, there is no jar either on the horse or the occupant, inasmuch as they give slightly and rise gently over the obstacle.

I am aware that four-wheeled vehicles have been made in which the load is balanced over rear wheels, and I am aware that spring-connections have been made between the front and rear axles in vehicles not so balanced, but I am not aware that these features have ever been combined in a single vehicle or in a dog-cart, which I find produces a new and valuable result.

Having thus described my invention, the following is what I claim as new therein and desire to secure by Letters Patent:

1. In a vehicle, the combination of the rear axle and wheels, a body balanced over the rear axle, a front axle by which the vehicle is drawn, and the upwardly-curved spring-bars connecting the front and rear parts of the vehicle together, as and for the purposes herein specified.

2. The combination of the rear axle, the body mounted thereon, the front axle, and the curved spring-bars connecting the front axle to the body and forming the frame for the dash-board, substantially as set forth.

3. The combination of the rear axle and body balanced thereon, the front axle, and the horizontally and vertically elastic connection consisting of the upwardly-curved spring-bars having the spacing and bracing yoke, which also forms the rein-rack, substantially as set forth.

4. The combination of the rear axle carrying the body, the front axle having the fifth-wheel, and the converging springs having their ends made to conform to the fifth-wheel and secured thereto, substantially as set forth.

5. The combination, with the front and rear axles and body, of the curved spring-bars having the curve prolonged and terminating in the rearwardly-extending ends, as and for the purpose set forth.

6. The combination, with a dog-cart having the body balanced, as explained, of the front axle, by which the vehicle is drawn, connected to the dog-cart by the elastic undercut connection, and a reach-pole connected with the two axles for the purpose of preventing undue stress on the spring, in the manner and for the purpose set forth.

WILLIAM H. BARLOW.

Witnesses:
C. R. HARRIS,
C. D. FISHBURRY.